(12) United States Patent
Yang et al.

(10) Patent No.: US 11,950,295 B2
(45) Date of Patent: *Apr. 2, 2024

(54) RACH RESOURCE SELECTION METHOD, RACH RESOURCE CONFIGURATION METHOD, USER EQUIPMENT, AND NETWORK-SIDE DEVICE

(71) Applicant: VIVO MOBILE COMMUNICATION CO., LTD., Chang'an, Dongguan (CN)

(72) Inventors: Xiaodong Yang, Chang'an Dongguan (CN); Jianping Zhou, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,801

(22) Filed: May 1, 2023

(65) Prior Publication Data
US 2023/0269782 A1    Aug. 24, 2023

Related U.S. Application Data

(63) Continuation of application No. 17/094,223, filed on Nov. 10, 2020, now Pat. No. 11,678,376, which is a (Continued)

(30) Foreign Application Priority Data

May 10, 2018    (CN) .......................... 201810445226.0

(51) Int. Cl.
*H04W 74/08*    (2009.01)
*H04W 74/00*    (2009.01)
*H04W 74/0833*    (2024.01)

(52) U.S. Cl.
CPC ..... *H04W 74/0833* (2013.01); *H04W 74/006* (2013.01)

(58) Field of Classification Search
CPC ........... H04W 74/0833; H04W 74/006; H04W 74/004; H04W 72/02; H04W 72/0446; H04W 72/23
See application file for complete search history.

(56) References Cited

U.S. PATENT DOCUMENTS 8,565,212 B2 * 10/2013 Zhang .................. H04L 5/0044
370/344
9,980,283 B2 * 5/2018 Li ......................... H04L 5/0007
(Continued)

FOREIGN PATENT DOCUMENTS

CN    101686560 A    3/2010
CN    102752859 A    10/2012
(Continued)

OTHER PUBLICATIONS

First Chinese Office Action related to Application No. 201810445226.0; dated Nov. 3, 2020.
(Continued)

*Primary Examiner* — Rasheed Gidado
(74) *Attorney, Agent, or Firm* — von Briesen & Roper, s.c.

(57) ABSTRACT

This disclosure provides a RACH resource selection method, a RACH resource configuration method, user equipment, and a network-side device. The RACH resource selection method is applied to the user equipment and includes: after a random access process is triggered, selecting, based on obtained RACH resource configuration information, a PRACH transmit unit used for sending a preamble or a preamble and data.

20 Claims, 5 Drawing Sheets

Send RACH resource configuration information to user equipment, where the RACH resource configuration information is used by the user equipment to select, after a random access process is triggered, a PRACH transmit unit used for sending a preamble or a preamble and data ⟶ 201

Related U.S. Application Data continuation of application No. PCT/CN2019/084769, filed on Apr. 28, 2019.

(56) References Cited

U.S. PATENT DOCUMENTS

| | | | |
|---|---|---|---|
| 10,070,435 B2* | 9/2018 | Lee | H04W 74/0833 |
| 10,873,929 B2* | 12/2020 | Kim | H04W 72/51 |
| 11,184,930 B2* | 11/2021 | Lim | H04W 72/23 |
| 2009/0034452 A1 | 2/2009 | Somasundaram et al. | |
| 2010/0331003 A1 | 12/2010 | Park et al. | |
| 2012/0320842 A1 | 12/2012 | Jeong et al. | |
| 2014/0198748 A1 | 7/2014 | Lee et al. | |
| 2016/0021681 A1 | 1/2016 | Nan et al. | |
| 2016/0353486 A1 | 12/2016 | Xia | |
| 2017/0055295 A1 | 2/2017 | Somasundaram et al. | |
| 2017/0231011 A1 | 8/2017 | Park et al. | |
| 2019/0230713 A1 | 7/2019 | Geng et al. | |
| 2020/0005997 A1 | 1/2020 | Mccall et al. | |
| 2020/0059971 A1 | 2/2020 | Qian et al. | |
| 2020/0205202 A1 | 6/2020 | Takahashi et al. | |
| 2021/0010581 A1 | 1/2021 | Fukuda | |
| 2021/0105813 A1* | 4/2021 | Lee | H04W 76/27 |

FOREIGN PATENT DOCUMENTS

| | | |
|---|---|---|
| CN | 106028407 A | 10/2016 |
| CN | 106102182 A | 11/2016 |
| CN | 107889190 A | 4/2018 |
| JP | 2017506479 A | 3/2017 |
| JP | 2017069970 A | 4/2017 |
| WO | 2013009068 A3 | 3/2013 |

OTHER PUBLICATIONS

First Japanese Office Action related to Application No. 2020-563621; dated Dec. 27, 2021.
First Korean Office Action related to Application No. 10-2020-7035612; dated Feb. 23, 2022.
United States Non-Final Office Action related to U.S. Appl. No. 17/094,223; dated Mar. 25, 2022.
United States Final Office Action related to U.S. Appl. No. 17/094,223; dated Oct. 12, 2022.
Extended European Search Report related to Application No. 19799547.5; dated May 31, 2021.
International Search Report and Written Opinion related to Application No. PCT/CN2019/084769; dated Nov. 19, 2020.
R1-1720171—Source: CATT "OSI Delivery", Agenda Item: 7.1.2.3, Document for: Discussion and Decision, 3GPP TSG RAN WG1 Meeting 91, Reno, USA, Nov. 27-Dec. 1, 2017.
R2-1804404—Source: ZTE, Sanechips "Discussion on the selection of RO in CBRA procedure", Agenda Item: 10.3.1.4.3, Document for: Discussion and Decision, 3GPP TSG RAN WG2 Meeting #101bis, Sanya, China, Apr. 16-Apr. 20, 2018.
R2-1805988—Source: Qualcomm Incorporated "Dedicated RACH occasion for CFRA", Agenda Item: 10.3.1.4.3, WID/SID: NR_newRAT-Core—Release 15, Document for: Discussion and Decision, 3GPP TSG RAN WG2 Meeting #101bis, Sanya, China, Apr. 16-20, 2018.
R2-1806215—Source to WG: Samsung "Miscellaneous corrections", 3GPP TSG-RAN WG2 Meeting #101bis, Sanya, China, Apr. 16-20, 2018, Current version 15.1.0.

* cited by examiner

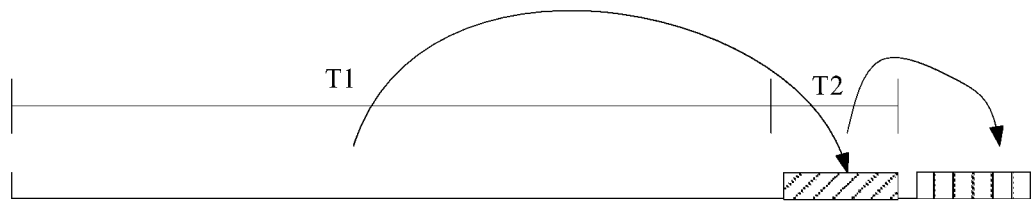

FIG. 3

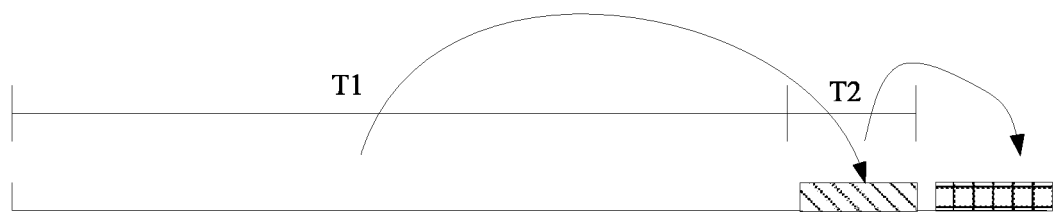

FIG. 4

```
After a random access process is triggered, select, based on    ┌─ 101
obtained RACH resource configuration information, a
PRACH transmit unit used for sending a preamble or a
preamble and data
```

FIG. 5

```
Send RACH resource configuration information to user        ┌─ 201
equipment, where the RACH resource configuration
information is used by the user equipment to select, after a
random access process is triggered, a PRACH transmit unit
used for sending a preamble or a preamble and data
```

FIG. 6

First PRACH transmit set

Second PRACH transmit set

Third PRACH transmit set

RACH RESOURCE SELECTION METHOD, RACH RESOURCE CONFIGURATION METHOD, USER EQUIPMENT, AND NETWORK-SIDE DEVICE

CROSS-REFERENCE TO RELATED APPLICATIONS

This application is a continuation of U.S. patent application Ser. No. 17/094,223 which is a continuation application of International Application No. PCT/CN2019/084769 filed on Apr. 28, 2019, which claims priority to Chinese Patent Application No. 201810445226.0 filed in China on May 10, 2018, which is incorporated herein by reference in its entirety.

TECHNICAL FIELD

This disclosure relates to the field of communications technologies, and in particular, to a RACH resource selection method, a RACH resource configuration method, user equipment, and a network-side device.

BACKGROUND

Long Term Evolution (Long Term Evolution, LTE) and New Radio (New Radio, NR) communications systems in the related art need to support a random access process to achieve a variety of purposes. A random access channel (Random access channel, RACH) process is divided into a contention-based random access process and a non-contention-based random access process. In both the contention-based random access process and the non-contention-based random access process, a preamble (preamble) needs to be sent by user equipment (User Equipment, UE) to a network-side device.

In NR, a plurality of frequency-division multiplexed (Frequency-division multiplexing, FDM) physical random access channel transmission occasions (PRACH transmission occasion) or physical random access channel occasions (PRACH occasion), which are referred to as ROs, may be configured by the network-side device in a time instance (time instance) (which is duration required for transmitting a physical random access channel (Physical Random access channel, PRACH) resource, also referred to as a time domain location for transmitting the PRACH herein). A quantity of ROs FDMed in one time instance may be {1, 2, 4, 8}.

A PRACH resource period in NR in the related art may be 10 ms, 20 ms, 40 ms, 80 ms, or 160 ms. The UE in the related art selects a most appropriate RACH resource after triggering a random access process, that is, to select a nearest RACH resource. However, no matter how long the PRACH resource period is, a time domain length of the RACH resource is 10 ms, leading to a problem of RACH load imbalance.

SUMMARY

A technical problem to be resolved in this disclosure is to provide a RACH resource selection method, a RACH resource configuration method, user equipment, and a network-side device, so as to resolve a problem of RACH load imbalance.

According to a first aspect, an embodiment of this disclosure provides a random access channel RACH resource selection method, applied to user equipment. The RACH resource selection method includes:

after a random access process is triggered, selecting, based on obtained RACH resource configuration information, a physical random access channel PRACH transmit unit used for sending a preamble or a preamble and data.

According to a second aspect, an embodiment of this disclosure provides a random access channel RACH resource configuration method, applied to a network-side device. The RACH resource configuration method includes:

sending RACH resource configuration information to user equipment, where the RACH resource configuration information is used by the user equipment to select, after a random access process is triggered, a physical random access channel PRACH transmit unit used for sending a preamble or a preamble and data.

According to a third aspect, an embodiment of this disclosure provides user equipment, including:

a processing module, configured to: after a random access process is triggered, select, based on obtained RACH resource configuration information, a physical random access channel PRACH transmit unit used for sending a preamble or a preamble and data.

According to a fourth aspect, an embodiment of this disclosure provides a network-side device, including:

a sending module, configured to send random access channel RACH resource configuration information to user equipment, where the RACH resource configuration information is used by the user equipment to select, after a random access process is triggered, a physical random access channel PRACH transmit unit used for sending a preamble or a preamble and data.

According to a fifth aspect, an embodiment of this disclosure provides user equipment, including a memory, a processor, and a computer program stored in the memory and capable of running on the processor, and when the computer program is executed by the processor, the steps in the random access channel RACH resource selection method described above are implemented.

According to a sixth aspect, an embodiment of this disclosure provides a network-side device, including a memory, a processor, and a computer program stored in the memory and capable of running on the processor, and when the computer program is executed by the processor, the steps in the random access channel RACH resource configuration method described above are implemented.

According to a seventh aspect, an embodiment of this disclosure provides a computer-readable storage medium. The computer-readable storage medium stores a computer program, and when the computer program is executed by a processor, the steps in the random access channel RACH resource selection method described above are implemented, or the steps in the RACH resource configuration method described above are implemented.

The embodiments of this disclosure have the following beneficial effects:

In the foregoing solution, after the random access process is triggered, the user equipment selects, based on the obtained RACH resource configuration information, the PRACH transmit unit used for sending the preamble or the preamble and data, but not necessarily select a nearest RACH resource to send the preamble or the preamble and data. Configuring the RACH resource configuration information can avoid a problem of RACH load imbalance.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

FIG. 3 and FIG. 4 are schematic diagrams of RACH load imbalance;

FIG. 5 is a schematic diagram of a RACH resource selection method according to an embodiment of this disclosure;

FIG. 6 is a schematic diagram of a RACH resource configuration method according to an embodiment of this disclosure;

DESCRIPTION OF EMBODIMENTS

Figure 1:
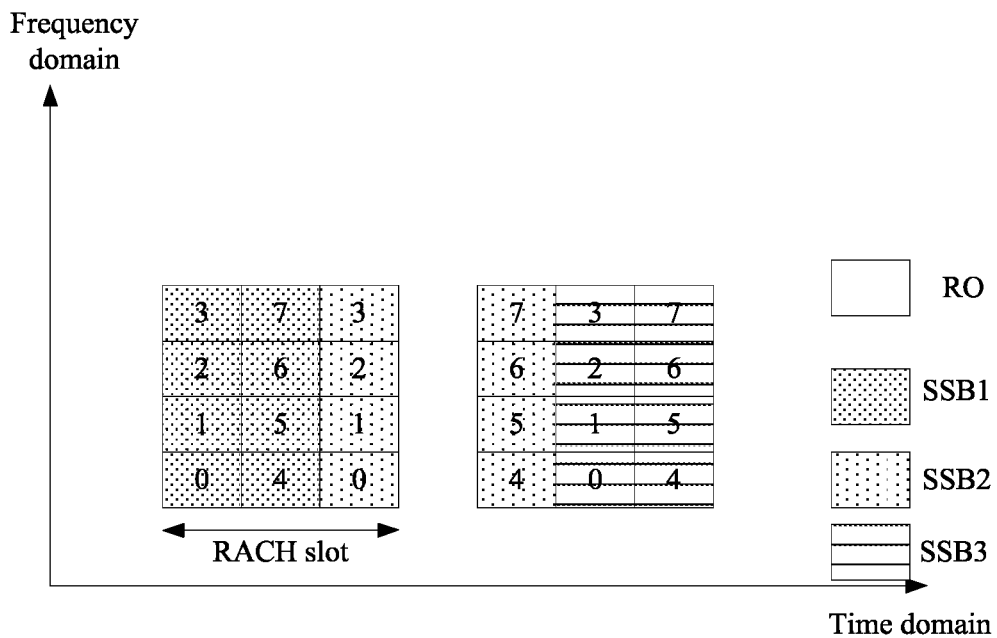
FIG. 1 is a schematic diagram of RO-SSB association.

Exemplary embodiments of this disclosure will be described below in more detail with reference to the accompanying drawings. Although the accompanying drawings show exemplary embodiments of this disclosure, it should be understood that this disclosure may be implemented in various forms and should not be limited by the embodiments described herein. Instead, these embodiments are provided so that this disclosure will be better understood, and the scope of this disclosure can be fully conveyed to those skilled in the art.

In this specification and claims of this application, the terms such as "first" and "second" are intended to distinguish between similar objects but do not necessarily indicate a specific order or sequence. It should be understood that the data termed in such a manner are interchangeable in proper cases so that the embodiments of this application can be implemented in other orders than the order illustrated or described in this application. Moreover, the terms "include", "contain", and any other variants are intended to cover the non-exclusive inclusion, for example, a process, method, system, product, or device that includes a list of steps or units is not necessarily limited to those units, but may include other units not expressly listed or inherent to such a process, method, system, product, or device.

Both LTE and NR communication systems in the related art need to support a random access process to achieve a variety of purposes. The random access process is triggered in the following cases:

1. Initial network access by UE in an initial radio resource control (Radio Resource Control, RRC) idle (idle) state;
2. RRC re-establishment;
3. Handover;
4. Arrival of downlink data with uplink out of synchronization;
5. Arrival of uplink data with downlink out of synchronization;
6. UE transition from an inactive (inactive) state to an activated (active) state; and
7. Uplink synchronization acquisition for a secondary cell (Scell).

The random access process may be triggered by the UE, or may be triggered by the network-side device.

The RACH process is divided into a contention-based random access process and a non-contention-based random access process. For both the contention-based random access process and non-contention-based random access process, the UE needs to send a preamble or a preamble and data to the network-side device.

In NR, a plurality of FDM ROs can be configured in one time instance by the network-side device. A quantity of ROs FDMed in one time instance may be {1, 2, 4, 8}.

A random access preamble can be transmitted only on a time domain resource configured by using a PRACH configuration index (Configuration Index) parameter, and the random access preamble can be transmitted only on a frequency domain resource configured by using a prach-FDM parameter. The PRACH frequency domain resource is $n_{RA} \in \{0, 1, \ldots, M-1\}$ s, where M is equal to the higher-layer parameter prach-FDM. During initial access, the PRACH frequency domain resources $n_{RA}$ are numbered in increasing order from a RO resource with a lowest frequency in an initial active uplink bandwidth part (initial active uplink bandwidth part); otherwise, the PRACH frequency domain resources $n_{RA}$ are numbered in increasing order from a RO resource with a lowest frequency in an active uplink bandwidth part (active uplink bandwidth part).

Based on PRACH resource-related parameters (for example, PRACH Configuration Index or prach-FDM), the user equipment can determine an RO resource pattern within a PRACH configuration period (Configuration Period), where the RO resource pattern includes a size of one RO resource, a time domain location of the RO, a frequency domain location of the RO, a quantity of ROs, and the like in the PRACH configuration period. The PRACH configuration period may be {10, 20, 40, 80, 160} ms, and the RO resource pattern is the same for each PRACH configuration period.

In NR, there is an association relationship between a RO and an actually transmitted SSB (SS/PBCH block, synchronous signal/physical broadcast channel block, SS block for short, synchronous signal block). One RO may be associated with a plurality of SSBs. A quantity of SSBs associated with one RO may be: {⅛, ¼, ½, ½, 2, 4, 8, 16}. For the non-contention-based random access process, the RO may also be in an association relationship with a channel state information reference signal (CSI reference signals, CSI-RS).

In a specific example, as shown in FIG. 1, it is assumed that one RO is associated with ⅛ SSBs, there are four ROs FDMed in one time instance, and there are a total of three SSBs numbered 1 to 3.

Figure 2:
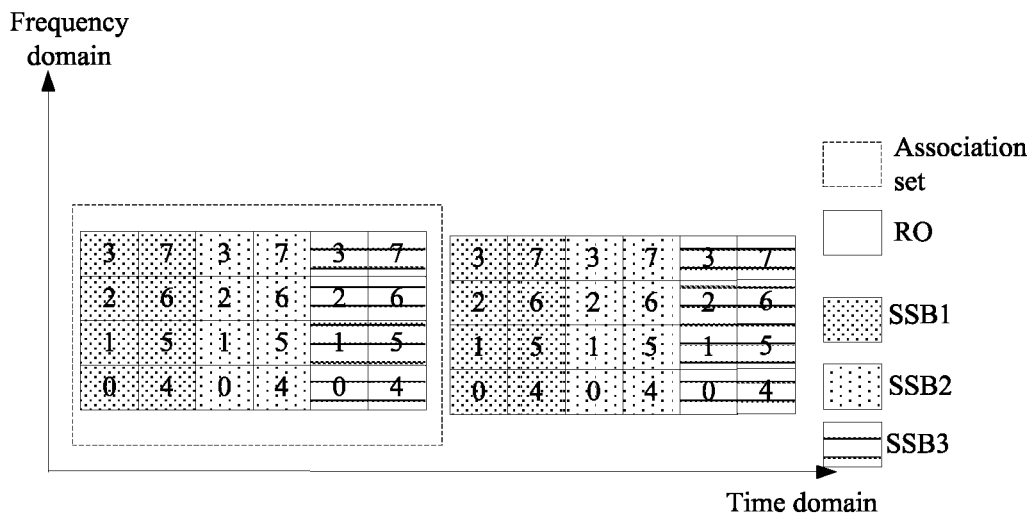
FIG. 2 is a schematic diagram of performing two times of SSB-RO mapping in a PRACH configuration period.

When the total quantity of ROs configured in one PRACH configuration period is greater than or equal to a quantity of ROs required for two times of SSB-RO mapping, SSB-RO mapping can be repeated on these ROs. Assuming that one RO is associated with ⅛ SSBs and there are a total of three SSBs numbered SSBs 1 to 3, 8*3=24 ROs are required to complete SSB-RO mapping once. There are 12 time instances in one PRACH configuration period and 4 ROs FDMed in one time instance; then, there are 12*4=48 ROs in one PRACH configuration period. Therefore, SSB-RO mapping can be performed twice in the configuration period, as shown in FIG. 2.

If there are 72 ROs in one PRACH configuration period, SSB-RO mapping can be performed three times in the configuration period. More ROs indicates more times of SSB-RO mapping to be performed. For convenience, a set of ROs required to complete SSB-RO mapping once is called an association group or an association set (association set).

The same holds true for CSI-RS-RO mapping. More ROs indicates more times of CSI-RS-RO mapping. For convenience, a set of ROs required to complete CSI-RS-RO mapping once is called an association group or an association set (association set).

A RO combination set may be a set of ROs. The set may be a RO set different in frequency domain but the same in time domain, or a RO set different in time domain but the same in frequency domain, or a RO set different in both time domain and frequency domain.

The RO combination set may be agreed in advance or configured by the network-side device. Agreement in advance may be agreement made in advance by the network-side device and the UE, or may be recorded in the communications protocol and stipulated by the communications protocol.

A PRACH resource period in NR in the related art may be 10 ms, 20 ms, 40 ms, 80 ms, or 160 ms. The UE in the related art selects a most appropriate RACH resource after triggering a random access process, that is, to select a nearest RACH resource. However, no matter how long the PRACH resource period is, a time domain length of the RACH resource is 10 ms, leading to a problem of RACH load imbalance.

As shown in FIG. 3, there are two PRACH resources: a first part of PRACH subframe and a second part of PRACH subframe. Because the UE selects a most appropriate RACH resource after triggering a random access process, that is, to select a nearest RACH resource, the first PRACH resource is selected in a T1 time segment by all triggered random access processes that have no PRACH resources, and the second PRACH resource is selected only by a triggered random access process in a T2 time segment. This results in heavier RACH load (preamble transmission) on the first part of PRACH subframe than on the second part of PRACH subframe, leading to RACH load imbalance. As shown in FIG. 4, a similar problem exists in a case in which a plurality of SSBs are associated with a RO.

For the foregoing problem, the embodiments of this disclosure provide a RACH resource selection method, a RACH resource configuration method, user equipment, and a network-side device, so as to resolve the problem of RACH load imbalance.

An embodiment of this disclosure provides a RACH resource selection method, applied to user equipment. As shown in FIG. 5, the RACH resource selection method includes the following steps.

Step 101: After a random access process is triggered, select, based on obtained RACH resource configuration information, a physical random access channel PRACH transmit unit used for sending a preamble or a preamble and data.

In this embodiment, after the random access process is triggered, the user equipment selects, based on the obtained RACH resource configuration information, the PRACH transmit unit used for sending the preamble or the preamble and data, but not necessarily select a nearest RACH resource to send the preamble or the preamble and data. Configuring the RACH resource configuration information can avoid a problem of RACH load imbalance.

The PRACH transmit unit is a RACH resource occupied for sending the preamble or the preamble and data, and the PRACH transmit unit includes at least one of the following:

an OFDM symbol, a PRACH subframe, a slot, a PRACH slot, a physical random access channel occasion RO, a RO association set, a RO combination set, and an absolute time unit.

The RACH resource configuration information may be agreed in advance, or may be delivered to the user equipment by a network-side device, and is received and stored in advance by the user equipment. When the RACH resource configuration information is delivered to the user equipment by the network-side device, the method further includes:

receiving the RACH resource configuration information sent by the network-side device.

Further, the RACH resource configuration information includes at least one of the following:

preamble format information of PRACH resources available for selection;

time domain location information of PRACH resources available for selection;

frequency domain location information of PRACH resources available for selection;

a time window corresponding to PRACH transmit units available for selection, where a first PRACH transmit unit in the time window is a first valid PRACH transmit unit after the random access process is triggered;

N PRACH transmit units available for selection, where a first PRACH transmit unit in the N PRACH transmit units is a first valid PRACH transmit unit after the random access process is triggered, and N is a positive integer; and a correspondence between a RACH trigger time and a PRACH transmit set, where the PRACH transmit set includes at least one PRACH transmit unit.

The N PRACH transmit units may be N consecutive PRACH transmit units.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Agreement in advance may be agreement made in advance by the network-side device and the UE, or may be recorded in the communications protocol and stipulated by the communications protocol.

Further, the RACH parameter includes at least one of the following:

a priority of a service for which RACH is initiated;

a reason for triggering connection re-establishment;

a PRACH period; and a correlation between a RO and a synchronous signal block SSB.

Further, the RACH resource configuration information further includes at least one of the following:

a probability of selecting a PRACH transmit unit from the time window; and a probability of selecting a PRACH transmit unit from the N PRACH transmit units.

Further, the selecting a PRACH transmit unit specifically includes at least one of the following:

selecting the PRACH transmit unit from the time window based on an agreed probability; and selecting the PRACH transmit unit from the N PRACH transmit units based on an agreed probability.

Further, a window length unit of the time window includes at least one of the following:

an OFDM symbol, a PRACH subframe, a slot, a PRACH slot, a physical random access channel occasion RO, a RO association set, a RO combination set, and an absolute time unit.

An embodiment of this disclosure provides a RACH resource configuration method, applied to a network-side device. As shown in FIG. 6, the RACH resource configuration method includes the following steps.

Step 201: Send RACH resource configuration information to user equipment, where the RACH resource configuration information is used by the user equipment to select, after a random access process is triggered, a physical random access channel PRACH transmit unit used for sending a preamble or a preamble and data.

In this embodiment, the network-side device sends the RACH resource configuration information to the user equipment. After the random access process is triggered, the user equipment selects, based on the obtained RACH resource configuration information, the PRACH transmit unit used for sending the preamble or the preamble and data, but not necessarily select a nearest RACH resource to send the preamble or the preamble and data. Configuring the RACH resource configuration information can avoid a problem of RACH load imbalance.

Further, the RACH resource configuration information includes at least one of the following:

preamble format information of PRACH resources available for selection;

time domain location information of PRACH resources available for selection;

frequency domain location information of PRACH resources available for selection;

a time window corresponding to PRACH transmit units available for selection, where a first PRACH transmit unit in the time window is a first valid PRACH transmit unit after the random access process is triggered;

N PRACH transmit units available for selection, where a first PRACH transmit unit in the N PRACH transmit units is a first valid PRACH transmit unit after the random access process is triggered, and N is a positive integer; and a correspondence between a RACH trigger time and a PRACH transmit set, where the PRACH transmit set includes at least one PRACH transmit unit.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Further, the RACH parameter includes at least one of the following:

a priority of a service for which RACH is initiated;

a reason for triggering connection re-establishment;

a PRACH period; and a correlation between a RO and a synchronous signal block SSB.

Further, the RACH resource configuration information further includes at least one of the following:

a probability of selecting a PRACH transmit unit from the time window; and a probability of selecting a PRACH transmit unit from the N PRACH transmit units.

Further, the PRACH transmit unit includes at least one of the following:

an OFDM symbol, a PRACH subframe, a slot, a PRACH slot, a physical random access channel occasion RO, a RO association set, a RO combination set, and an absolute time unit.

Further, a window length unit of the time window includes at least one of the following:

an OFDM symbol, a PRACH subframe, a slot, a PRACH slot, a physical random access channel occasion RO, a RO association set, a RO combination set, and an absolute time unit.

The technical solutions of this disclosure are further described below with reference to specific embodiments.

Embodiment 1

In this embodiment, after the UE triggers a random access process, the UE finds the first valid PRACH transmit unit, and in one continuous time window starting from this valid PRACH transmit unit, selects a PRACH transmit unit in the time window based on an equal probability or a given probability to send a preamble or a preamble and data.

A start time of the time window is a moment at which the random access process is triggered. A window length unit of the time window includes at least one of the following: an OFDM symbol, a PRACH subframe, a slot, a PRACH slot, a physical random access channel occasion RO, a RO association set, a RO combination set, and an absolute time unit (such as ms).

The equal probability means that a same selection probability is configured for all PRACH transmit units in the time window, or that different selection probabilities may be configured for different PRACH transmit units in the time window. The selection probability may be agreed in advance or configured by the network-side device. For example, there are two PRACH transmit units in the time window. The first PRACH transmit unit has a selection probability of 50%. If the first PRACH transmit unit is not selected, the second PRACH transmit unit is selected.

The RO combination set may be defined as a set of ROs in time domain or frequency domain, and may be configured by the network-side device or agreed in advance.

Embodiment 2

In this embodiment, after the UE triggers a random access process, the UE finds the first valid PRACH transmit unit, and selects, from next N PRACH transmit units starting from this valid PRACH transmit unit, a PRACH transmit unit based on an equal probability or a given probability to send a preamble or a preamble and data.

The PRACH transmit unit includes at least one of the following: an OFDM symbol, a PRACH subframe, a slot, a PRACH slot, a physical random access channel occasion RO, a RO association set, a RO combination set, and an absolute time unit (such as ms).

The equal probability means that a same selection probability is configured for the N PRACH transmit units, or that different selection probabilities may be configured for different PRACH transmit units. The selection probability may be agreed in advance or configured by the network-side device. For example, N=2. A selection probability of the first PRACH transmit unit is 50%, and if the first PRACH transmit unit is not selected, the second PRACH transmit unit is selected.

The RO combination set may be defined as a set of ROs in time domain or frequency domain, and may be configured by the network-side device or agreed in advance.

Embodiment 3

In this embodiment, on a basis of Embodiment 1 and Embodiment 2, the window length information of the time window or the value of N may be determined based on a priority of a service for which the UE initiates the RACH or based on a reason for triggering connection re-establishment.

For example, if the service has a high priority, a RACH level is high, and the a reason for triggering connection re-establishment is emergency call, the UE can select the nearest PRACH transmit unit, that is, the time window includes one PRACH transmit unit or the value of N is set to 1, so that the UE sends the preamble or the preamble and data on the first nearest PRACH transmit unit.

If the service has a low priority, different window length information or a different value of N may be set.

Embodiment 4

In this embodiment, on a basis of Embodiment 1 and Embodiment 2, the window length information of the time window or the value of N may be determined based on a PRACH period or a correlation between a RO and a SSB.

A long PRACH period indicates a higher degree of RACH load imbalance. Therefore, the window length information of the time window or the value of N may be determined based on different PRACH periods. For example, a longer PRACH period indicates longer window length information and a larger value of N.

Similarly, the window length information of the time window or the value of N may also be determined based on the correlation between a RO and a SSB. For example, a smaller correlation between a RO and a SSB indicates longer window length information and a larger value of N.

Embodiment 5

A correspondence between a RACH trigger time and a PRACH transmit set is configured in this embodiment, where the PRACH transmit set includes at least one PRACH transmit unit.

Figure 7:
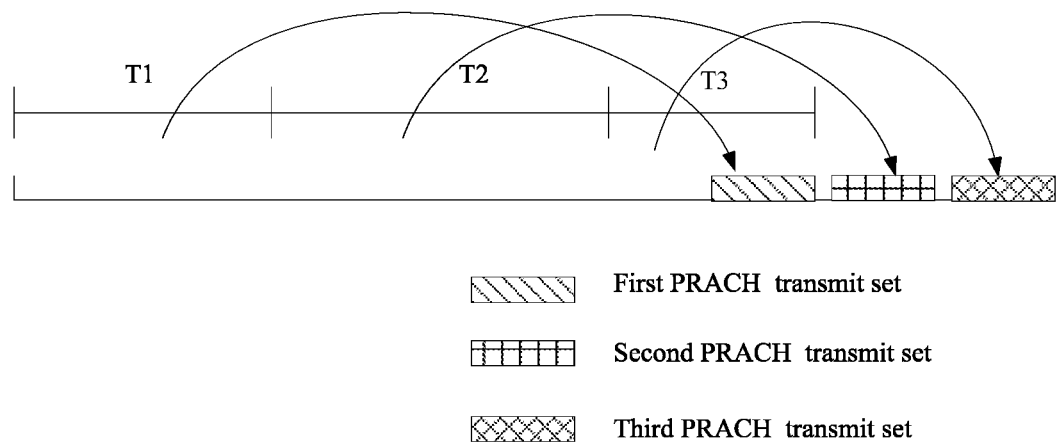
FIG. 7 is a schematic diagram of a correspondence between a RACH trigger time and a PRACH transmit set according to an embodiment of this disclosure.

As shown in FIG. 7, a T1 time segment corresponds to a first PRACH transmit set, a T2 time segment corresponds to a second PRACH transmit set, and a T3 time segment corresponds to a third PRACH transmit set.

Figure 8:
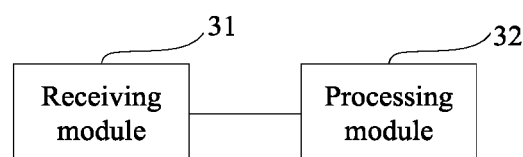
FIG. 8 is a schematic structural diagram of user equipment according to an embodiment of this disclosure.

An embodiment of this disclosure provides user equipment. As shown in FIG. 8, the user equipment includes:

a processing module 32, configured to: after a random access process is triggered, select, based on obtained RACH resource configuration information, a physical random access channel PRACH transmit unit used for sending a preamble or a preamble and data.

In this embodiment, after the random access process is triggered, the user equipment selects, based on the obtained RACH resource configuration information, the PRACH transmit unit used for sending the preamble or the preamble and data, but not necessarily select a nearest RACH resource to send the preamble or the preamble and data. Configuring the RACH resource configuration information can avoid a problem of RACH load imbalance.

The RACH resource configuration information may be agreed in advance, or may be delivered to the user equipment by a network-side device. When the RACH resource configuration information is delivered to the user equipment by the network-side device, the user equipment further includes:

a receiving module 31, configured to receive the RACH resource configuration information sent by the network-side device.

Further, the RACH resource configuration information includes at least one of the following:
  preamble format information of PRACH resources available for selection;
  time domain location information of PRACH resources available for selection;
  frequency domain location information of PRACH resources available for selection;
  a time window corresponding to PRACH transmit units available for selection, where a first PRACH transmit unit in the time window is a first valid PRACH transmit unit after the random access process is triggered;
  N PRACH transmit units available for selection, where a first PRACH transmit unit in the N PRACH transmit units is a first valid PRACH transmit unit after the random access process is triggered, and N is a positive integer; and
  a correspondence between a RACH trigger time and a PRACH transmit set, where the PRACH transmit set includes at least one PRACH transmit unit.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Further, the RACH parameter includes at least one of the following:
  a priority of a service for which RACH is initiated;
  a reason for triggering connection re-establishment;
  a PRACH period; and
  a correlation between a RO and a synchronous signal block SSB.

Further, the RACH resource configuration information further includes at least one of the following:
  a probability of selecting a PRACH transmit unit from the time window; and
  a probability of selecting a PRACH transmit unit from the N PRACH transmit units.

Further, the processing module 32 is specifically configured to perform at least one of the following steps:
  selecting the PRACH transmit unit from the time window based on an agreed probability; and
  selecting the PRACH transmit unit from the N PRACH transmit units based on an agreed probability.

Further, the PRACH transmit unit includes at least one of the following:

an OFDM symbol, a PRACH subframe, a slot, a PRACH slot, a physical random access channel occasion RO, a RO association set, a RO combination set, and an absolute time unit.

Further, a window length unit of the time window includes at least one of the following:

an OFDM symbol, a PRACH subframe, a slot, a PRACH slot, a physical random access channel occasion RO, a RO association set, a RO combination set, and an absolute time unit.

Figure 9:
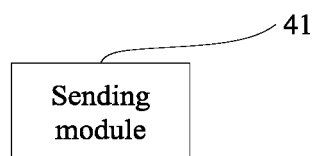
FIG. 9 is a schematic structural diagram of a network-side device according to an embodiment of this disclosure.

An embodiment of this disclosure provides a network-side device. As shown in FIG. 9, the network-side device includes:

a sending module 41, configured to send RACH resource configuration information to user equipment, where the RACH resource configuration information is used by the user equipment to select, after a random access process is triggered, a physical random access channel PRACH transmit unit used for sending a preamble or a preamble and data.

In this embodiment, the network-side device sends the RACH resource configuration information to the user equipment. After the random access process is triggered, the user equipment selects, based on the obtained RACH resource configuration information, the PRACH transmit unit used for sending the preamble or the preamble and data, but not necessarily select a nearest RACH resource to send the preamble or the preamble and data. Configuring the RACH resource configuration information can avoid a problem of RACH load imbalance.

Further, the RACH resource configuration information includes at least one of the following:

preamble format information of PRACH resources available for selection;

time domain location information of PRACH resources available for selection;

frequency domain location information of PRACH resources available for selection;

a time window corresponding to PRACH transmit units available for selection, where a first PRACH transmit unit in the time window is a first valid PRACH transmit unit after the random access process is triggered;

N PRACH transmit units available for selection, where a first PRACH transmit unit in the N PRACH transmit units is a first valid PRACH transmit unit after the random access process is triggered, and N is a positive integer; and a correspondence between a RACH trigger time and a PRACH transmit set, where the PRACH transmit set includes at least one PRACH transmit unit.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Further, the RACH parameter includes at least one of the following:

a priority of a service for which RACH is initiated;
a reason for triggering connection re-establishment;
a PRACH period; and a correlation between a RO and a synchronous signal block SSB.

Further, the RACH resource configuration information further includes at least one of the following:

a probability of selecting a PRACH transmit unit from the time window; and a probability of selecting a PRACH transmit unit from the N PRACH transmit units.

Further, the PRACH transmit unit includes at least one of the following:

an OFDM symbol, a PRACH subframe, a slot, a PRACH slot, a physical random access channel occasion RO, a RO association set, a RO combination set, and an absolute time unit.

Further, a window length unit of the time window includes at least one of the following:

an OFDM symbol, a PRACH subframe, a slot, a PRACH slot, a physical random access channel occasion RO, a RO association set, a RO combination set, and an absolute time unit.

An embodiment of this disclosure further provides a network-side device, including a memory, a processor, and a computer program stored in the memory and capable of running on the processor, and when the computer program is executed by the processor, the steps in the RACH resource configuration method described above are implemented.

Figure 10:
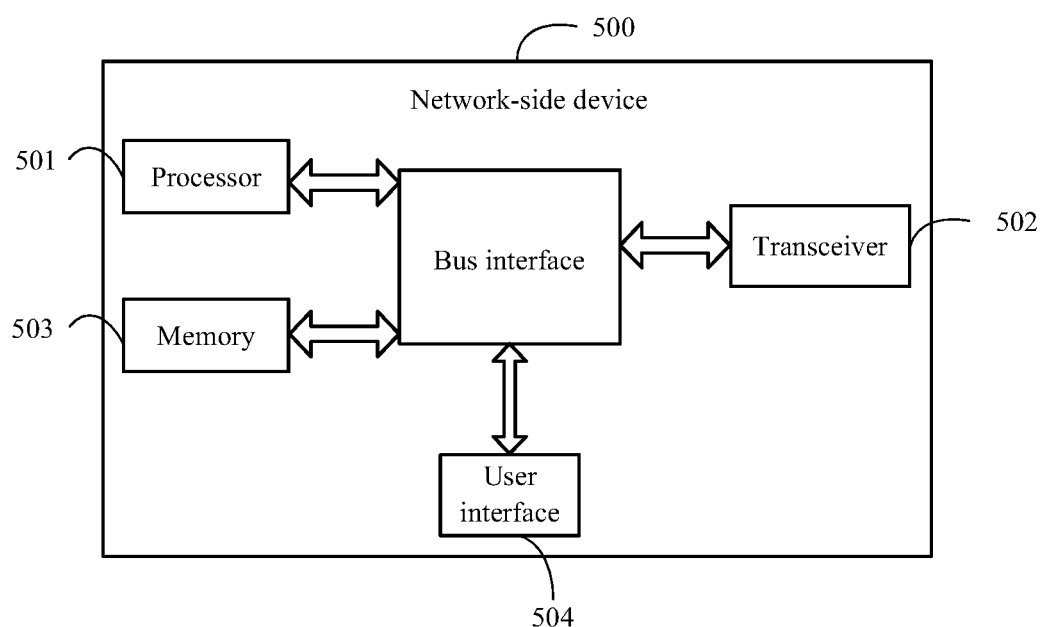
FIG. 10 is a schematic diagram of composition of a network-side device according to an embodiment of this disclosure.

FIG. 10 is a structural diagram of a network-side device to which an embodiment of this disclosure is applied. Details of the RACH resource configuration method in the foregoing embodiments can be implemented to achieve the same effects. As shown in FIG. 10, the network-side device 500 includes a processor 501, a transceiver 502, a memory 503, a user interface 504, and a bus interface.

In this embodiment of this disclosure, the network-side device 500 further includes a computer program stored in the memory 503 and capable of running on the processor 501. When the computer program is executed by the processor 501, the following steps are implemented: sending RACH resource configuration information to user equipment, where the RACH resource configuration information is used by the user equipment to select, after a random access process is triggered, a physical random access channel PRACH transmit unit used for sending a preamble or a preamble and data.

In FIG. 10, a bus architecture may include any quantity of interconnected buses and bridges, and specifically connects together circuits that are of one or more processors represented by the processor 501 and of a memory represented by the memory 503. The bus architecture may further connect together various other circuits such as a peripheral device, a voltage stabilizer, and a power management circuit. These are well known in the art, and therefore are not further described in this specification any more. The bus interface provides interfaces. The transceiver 502 may be a plurality of components, including a transmitter and a receiver, and provides units for communicating with a variety of other apparatuses on a transmission medium. For different user equipments, the user interface 504 may also be an interface that can be externally or internally connected to a required device. The connected device includes but is not limited to a keypad, a display, a speaker, a microphone, and a joystick.

The processor 501 is responsible for management of the bus architecture and general processing, and the memory 503 is capable of storing data that is used by the processor 501 during operation.

Further, the RACH resource configuration information includes at least one of the following:

preamble format information of PRACH resources available for selection;
time domain location information of PRACH resources available for selection;
frequency domain location information of PRACH resources available for selection;
a time window corresponding to PRACH transmit units available for selection, where a first PRACH transmit unit in the time window is a first valid PRACH transmit unit after the random access process is triggered;
N PRACH transmit units available for selection, where a first PRACH transmit unit in the N PRACH transmit units is a first valid PRACH transmit unit after the random access process is triggered, and N is a positive integer; and
a correspondence between a RACH trigger time and a PRACH transmit set, where the PRACH transmit set includes at least one PRACH transmit unit.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Further, the RACH parameter includes at least one of the following:
a priority of a service for which RACH is initiated;
a reason for triggering connection re-establishment;
a PRACH period; and
a correlation between a RO and a synchronous signal block SSB.

Further, the RACH resource configuration information further includes at least one of the following:
a probability of selecting a PRACH transmit unit from the time window; and
a probability of selecting a PRACH transmit unit from the N PRACH transmit units.

Further, the PRACH transmit unit includes at least one of the following:
an OFDM symbol, a PRACH subframe, a slot, a PRACH slot, a physical random access channel occasion RO, a RO association set, a RO combination set, and an absolute time unit.

Further, a window length unit of the time window includes at least one of the following:
an OFDM symbol, a PRACH subframe, a slot, a PRACH slot, a physical random access channel occasion RO, a RO association set, a RO combination set, and an absolute time unit.

An embodiment of this disclosure further provides user equipment, including a memory, a processor, and a computer program stored in the memory and capable of running on the processor, and when the computer program is executed by the processor, the steps in the RACH resource selection method described above are implemented.

Figure 11:
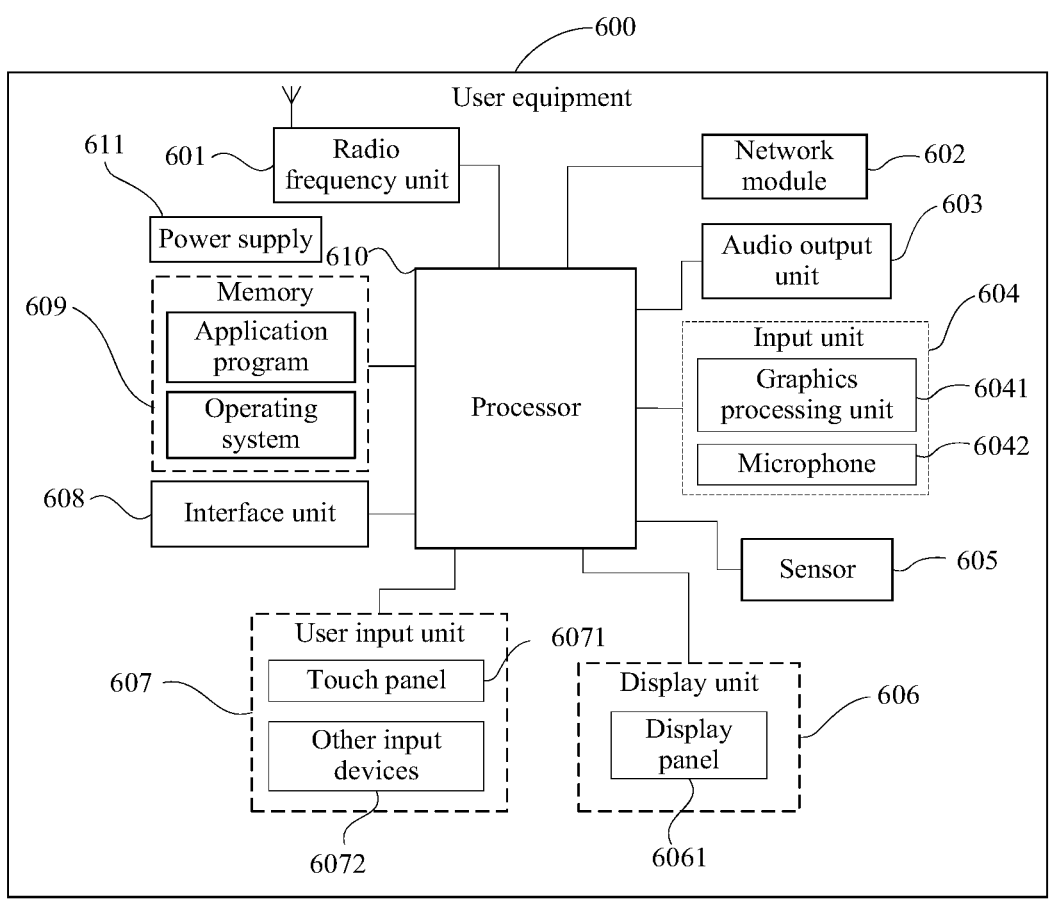
FIG. 11 is a schematic diagram of composition of user equipment according to an embodiment of this disclosure.

FIG. 11 is a schematic diagram of a hardware structure of user equipment for implementing the embodiments of this disclosure. Referring to FIG. 11, the user equipment 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art understands that the user equipment structure shown in FIG. 11 does not constitute any limitation on the user equipment. The user equipment may include more or fewer components than those shown in the figure, or some components may be combined, or the components may be disposed in different manners. In this embodiment of this disclosure, the user equipment includes but is not limited to a mobile phone, a tablet computer, a laptop computer, a palmtop computer, an in-vehicle terminal, a wearable device, a pedometer, and the like.

The processor 610 is configured to: after a random access process is triggered, select, based on obtained RACH resource configuration information, a physical random access channel PRACH transmit unit used for sending a preamble or a preamble and data.

The RACH resource configuration information may be agreed in advance, or may be delivered to the user equipment by a network-side device. When the RACH resource configuration information is delivered to the user equipment by the network-side device, the processor 610 is further configured to receive the RACH resource configuration information sent by the network-side device.

Further, the RACH resource configuration information includes at least one of the following:
preamble format information of PRACH resources available for selection;
time domain location information of PRACH resources available for selection;
frequency domain location information of PRACH resources available for selection;
a time window corresponding to PRACH transmit units available for selection, where a first PRACH transmit unit in the time window is a first valid PRACH transmit unit after the random access process is triggered;
N PRACH transmit units available for selection, where a first PRACH transmit unit in the N PRACH transmit units is a first valid PRACH transmit unit after the random access process is triggered, and N is a positive integer; and
a correspondence between a RACH trigger time and a PRACH transmit set, where the PRACH transmit set includes at least one PRACH transmit unit.

The N PRACH transmit units may be N consecutive PRACH transmit units.

Further, window length information of the time window is included in the RACH resource configuration information, or is obtained based on a correspondence between a RACH parameter and the window length information that is included in the RACH resource configuration information, or is agreed in advance.

A value of N is included in the RACH resource configuration information, or is obtained based on a correspondence between the RACH parameter and the value of N that is included in the RACH resource configuration information, or is agreed in advance.

Further, the RACH parameter includes at least one of the following:
a priority of a service for which RACH is initiated;
a reason for triggering connection re-establishment;
a PRACH period; and
a correlation between a RO and a synchronous signal block SSB.

Further, the RACH resource configuration information further includes at least one of the following:
a probability of selecting a PRACH transmit unit from the time window; and a probability of selecting a PRACH transmit unit from the N PRACH transmit units.

Further, the processor 610 is specifically configured to perform at least one of the following steps:

selecting the PRACH transmit unit from the time window based on an agreed probability; and selecting the PRACH transmit unit from the N PRACH transmit units based on an agreed probability.

Further, the PRACH transmit unit includes at least one of the following:

an OFDM symbol, a PRACH subframe, a slot, a PRACH slot, a physical random access channel occasion RO, a RO association set, a RO combination set, and an absolute time unit.

Further, a window length unit of the time window includes at least one of the following:

an OFDM symbol, a PRACH subframe, a slot, a PRACH slot, a physical random access channel occasion RO, a RO association set, a RO combination set, and an absolute time unit.

It should be understood that in an embodiment of this disclosure, the radio frequency unit 601 may be configured to: receive and send signals in an information receiving/sending process or a call process; and specifically, after receiving downlink data from a base station, send the downlink information to the processor 610 for processing, and in addition, send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The user equipment provides a user with wireless broadband internet access through the network module 602, for example, helping the user to send or receive an e-mail, to browse a web page, or to access streaming media.

The audio output unit 603 may convert audio data that is received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the user equipment 600. The audio output unit 603 includes a speaker, a buzzer, a telephone receiver, and the like.

The input unit 604 is configured to receive an audio or video signal. The input unit 604 may include a graphics processing unit (Graphics Processing Unit, GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted into a format that can be sent to a mobile communication base station through the radio frequency unit 601 in a telephone call mode, for outputting.

The user equipment 600 further includes at least one sensor 605, such as an optical sensor, a motion sensor, and other sensors. Specifically, the optical sensor includes an ambient light sensor and a proximity sensor. The ambient light sensor may adjust luminance of the display panel 6061 based on brightness of ambient light. The proximity sensor may turn off the display panel 6061 and/or backlight when the user equipment 600 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include a display panel 6061, and the display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digit or character information and generate key signal input related to user setting and function control of the user equipment. Specifically, the user input unit 607 includes a touch panel 6071 and other input devices 6072. The touch panel 6071, also referred to as a touchscreen, may capture a touch operation performed by the user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. Although in FIG. 11, the touch panel 6071 and the display panel 6061 act as two independent parts to implement input and output functions of the user equipment, in some embodiments, the touch panel 6071 and the display panel 6061 may be integrated to implement the input and output functions of the user equipment. This is not specifically limited herein.

The interface unit 608 is an interface between an external apparatus and the user equipment 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to: receive input (for example, data information and power) from the external apparatus, and transmit the received input to one or more elements in the user equipment 600, or may be configured to transmit data between the user equipment 600 and the external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the user equipment, and is connected to all components of the user equipment by using various interfaces and lines. By running or executing a software program and/or module that is stored in the memory 609 and calling data stored in the memory 609, the processor 610 executes various functions of the user equipment and processes data, so as to perform overall monitoring on the user equipment. The processor 610 may include one or more processing units. Optionally, an application processor and a modem processor may be integrated into the processor 610. The application processor mainly processes an operating system, a user interface, an application program, and the like. The modem processor mainly processes wireless communication. It may be understood that the modem processor may alternatively not be integrated into the processor 610.

The user equipment 600 further includes the power supply 611 (such as a battery) for supplying power to the components. Optionally, the power supply 611 may be logically connected to the processor 610 through a power management system. In this way, functions such as charge management, discharge management, and power consumption management are implemented by using the power management system.

In addition, the user equipment 600 includes some functional modules that are not shown, details of which are not described herein.

An embodiment of this disclosure further provides a computer-readable storage medium. The computer-readable storage medium stores a computer program, and when the computer program is executed by a processor, the steps in the RACH resource selection method described above are implemented, or the steps in the RACH resource configuration method described above are implemented It can be understood that the embodiments described in this specification may be implemented by hardware, software, firmware, middleware, microcode, or a combination thereof. For hardware implementation, the processing unit may be implemented in one or more application specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Pro-grammable Gate Array, FPGA), general-purpose processors, controllers, microcontrollers, microprocessors, and other electronic units for performing the functions described in this application, or a combination thereof.

For software implementation, the techniques described in the embodiments described in this specification may be implemented by modules (for example, procedures or functions) that perform the functions described in the embodiments described in this specification. Software code may be stored in the memory and executed by the processor. The memory may be implemented inside the processor or outside the processor.

All embodiments in this specification are described in a progressive manner. Each embodiment focuses on differences from other embodiments. For the part that is the same or similar between different embodiments, reference may be made between the embodiments.

Persons skilled in the art should understand that the embodiments of this disclosure may be provided as a method, an apparatus, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer usable program code.

The embodiments of this disclosure are described with reference to the flowcharts and/or block diagrams of the method, the user equipment (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing user equipment to generate a machine, so that the instructions executed by a computer or a processor of any other programmable data processing user equipment generate an apparatus for implementing a specific function in one or more processes in the flowcharts and/or in one or more blocks in the block diagrams.

These computer program instructions may be stored in a computer-readable memory that can guide the computer or any other programmable data processing user equipment to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or other programmable data processing user equipment, so that a series of operations and steps are performed on the computer or the other programmable user equipment, thereby generating computer-implemented processing. Therefore, the instructions executed on the computer or the other programmable user equipment provide steps for implementing a specific function in one or more processes in the flowcharts and/or in one or more blocks in the block diagrams.

Although some optional embodiments in the embodiments of this disclosure have been described, persons skilled in the art can make changes and modifications to these embodiments once they learn the basic inventive concept. Therefore, the following claims are intended to be construed as to cover the preferred embodiments and all changes and modifications falling within the scope of the embodiments of this disclosure.

It should be further noted that in this specification, relational terms such as "first" and "second" are only used to distinguish one entity or operation from another, and do not necessarily require or imply that any actual relationship or sequence exists between these entities or operations. Moreover, the terms "include", "comprise", or any of their variants are intended to cover a non-exclusive inclusion, such that a process, a method, an article, or user equipment that includes a list of elements not only includes those elements but also includes other elements that are not expressly listed, or further includes elements inherent to such process, method, article, or user equipment. In absence of more constraints, an element preceded by "includes a . . . " does not preclude the existence of other identical elements in the process, method, article, or user equipment that includes the element.

The foregoing descriptions are merely optional implementations of this disclosure. It should be noted that persons of ordinary skill in the art may make several improvements or polishing without departing from the principle of this disclosure and the improvements and polishing shall fall within the protection scope of this disclosure.

What is claimed is:

1. A random access channel RACH resource selection method, performed by user equipment and comprising:
   after a random access process is triggered, selecting, based on obtained RACH resource configuration information, a physical random access channel PRACH transmit unit used for sending a preamble or a preamble and data;
   wherein the RACH resource configuration information comprises at least one of the following:
   preamble format information of PRACH resources available for selection;
   time domain location information of PRACH resources available for selection;
   frequency domain location information of PRACH resources available for selection;
   a time window corresponding to PRACH transmit units available for selection, wherein a first PRACH transmit unit in the time window is a first valid PRACH transmit unit after the random access process is triggered;
   N PRACH transmit units available for selection, wherein a first PRACH transmit unit in the N PRACH transmit units is a first valid PRACH transmit unit after the random access process is triggered, and N is a positive integer; and
   a correspondence between a RACH trigger time and a PRACH transmit set, wherein the PRACH transmit set comprises at least one PRACH transmit unit;
   wherein the RACH resource configuration information further comprises:
   selecting the PRACH transmit unit from the N PRACH transmit units based on an agreed probability;
   wherein the N PRACH transmit units are N consecutive PRACH transmit units.

2. The RACH resource selection method according to claim 1, further comprising:
   receiving RACH resource configuration information sent by a network-side device.

3. The RACH resource selection method according to claim 1, wherein
   window length information of the time window is comprised in the RACH resource configuration information, or is obtained based on a correspondence between a RACH parameter and the window length information that is comprised in the RACH resource configuration information, or is agreed in advance; and
   a value of N is comprised in the RACH resource configuration information, or is obtained based on a correspondence between the RACH parameter and the value of N that is comprised in the RACH resource configuration information, or is agreed in advance.

4. The RACH resource selection method according to claim 3, wherein the RACH parameter comprises at least one of the following:
   a priority of a service for which RACH is initiated;
   a reason for triggering connection re-establishment;
   a PRACH period; and
   a correlation between a physical random access channel occasion (RO) and a synchronous signal block SSB.

5. The RACH resource selection method according to claim 1, wherein the PRACH transmit unit comprises at least one of the following:
   an orthogonal frequency division multiplexing (OFDM) symbol, a PRACH subframe, a slot, a PRACH slot, a physical random access channel occasion (RO), a RO association set, a RO combination set, and an absolute time unit.

6. The RACH resource selection method according to claim 1, wherein a window length unit of the time window comprises at least one of the following:
   an orthogonal frequency division multiplexing (OFDM) symbol, a PRACH subframe, a slot, a PRACH slot, a physical random access channel occasion (RO), a RO association set, a RO combination set, and an absolute time unit.

7. A random access channel RACH resource configuration method, performed by a network-side device and comprising:
   sending RACH resource configuration information to user equipment, wherein the RACH resource configuration information is configured to indicate a physical random access channel PRACH transmit unit used for sending a preamble or a preamble and data;
   wherein the RACH resource configuration information comprises at least one of the following:
   preamble format information of PRACH resources available for selection;
   time domain location information of PRACH resources available for selection;
   frequency domain location information of PRACH resources available for selection;
   a time window corresponding to PRACH transmit units available for selection, wherein a first PRACH transmit unit in the time window is a first valid PRACH transmit unit after the random access process is triggered;
   N PRACH transmit units available for selection, wherein a first PRACH transmit unit in the N PRACH transmit units is a first valid PRACH transmit unit after the random access process is triggered, and N is a positive integer; and
   a correspondence between a RACH trigger time and a PRACH transmit set, wherein the PRACH transmit set comprises at least one PRACH transmit unit;

wherein the RACH resource configuration information further comprises:
selecting the PRACH transmit unit from the N PRACH transmit units based on an agreed probability;
wherein the N PRACH transmit units are N consecutive PRACH transmit units.

8. The RACH resource configuration method according to claim 7, wherein
window length information of the time window is comprised in the RACH resource configuration information, or is obtained based on a correspondence between a RACH parameter and the window length information that is comprised in the RACH resource configuration information, or is agreed in advance; and
a value of N is comprised in the RACH resource configuration information, or is obtained based on a correspondence between the RACH parameter and the value of N that is comprised in the RACH resource configuration information, or is agreed in advance.

9. The RACH resource configuration method according to claim 8, wherein the RACH parameter comprises at least one of the following:
a priority of a service for which RACH is initiated;
a reason for triggering connection re-establishment;
a PRACH period; and
a correlation between a physical random access channel occasion (RO) and a synchronous signal block SSB.

10. The RACH resource configuration method according to claim 7, wherein the PRACH transmit unit comprises at least one of the following:
an orthogonal frequency division multiplexing (OFDM) symbol, a PRACH subframe, a slot, a PRACH slot, a physical random access channel occasion (RO), a RO association set, a RO combination set, and an absolute time unit.

11. The RACH resource configuration method according to claim 7, wherein a window length unit of the time window comprises at least one of the following:
an orthogonal frequency division multiplexing (OFDM) symbol, a PRACH subframe, a slot, a PRACH slot, a physical random access channel occasion (RO), a RO association set, a RO combination set, and an absolute time unit.

12. A user equipment, comprising a memory, a processor, and a computer program stored in the memory and capable of running on the processor, wherein when the computer program is executed by the processor, the processor is configured to,
after a random access process is triggered, select, based on obtained RACH resource configuration information, a physical random access channel PRACH transmit unit used for sending a preamble or a preamble and data;
wherein the RACH resource configuration information comprises at least one of the following:
preamble format information of PRACH resources available for selection;
time domain location information of PRACH resources available for selection;
frequency domain location information of PRACH resources available for selection;
a time window corresponding to PRACH transmit units available for selection, wherein a first PRACH transmit unit in the time window is a first valid PRACH transmit unit after the random access process is triggered;
N PRACH transmit units available for selection, wherein a first PRACH transmit unit in the N PRACH transmit units is a first valid PRACH transmit unit after the random access process is triggered, and N is a positive integer; and
a correspondence between a RACH trigger time and a PRACH transmit set, wherein the PRACH transmit set comprises at least one PRACH transmit unit;
wherein the RACH resource configuration information further comprises:
selecting the PRACH transmit unit from the N PRACH transmit units based on an agreed probability;
wherein the N PRACH transmit units are N consecutive PRACH transmit units.

13. The user equipment according to claim 12, wherein the processor is configured to receive RACH resource configuration information sent by a network-side device.

14. The user equipment according to claim 12, wherein
window length information of the time window is comprised in the RACH resource configuration information, or is obtained based on a correspondence between a RACH parameter and the window length information that is comprised in the RACH resource configuration information, or is agreed in advance; and
a value of N is comprised in the RACH resource configuration information, or is obtained based on a correspondence between the RACI parameter and the value of N that is comprised in the RACH resource configuration information, or is agreed in advance.

15. The user equipment according to claim 14, wherein the RACH parameter comprises at least one of the following:
a priority of a service for which RACH is initiated;
a reason for triggering connection re-establishment;
a PRACH period; and
a correlation between a physical random access channel occasion (RO) and a synchronous signal block SSB.

16. The user equipment according to claim 12, wherein the PRACH transmit unit comprises at least one of the following:
an orthogonal frequency division multiplexing (OFDM) symbol, a PRACH subframe, a slot, a PRACH slot, a physical random access channel occasion (RO), a RO association set, a RO combination set, and an absolute time unit.

17. The user equipment according to claim 12, wherein a window length unit of the time window comprises at least one of the following:
an orthogonal frequency division multiplexing (OFDM) symbol, a PRACH subframe, a slot, a PRACH slot, a physical random access channel occasion (RO), a RO association set, a RO combination set, and an absolute time unit.

18. A network-side device, comprising a memory, a processor, and a computer program stored in the memory and capable of running on the processor, wherein when the computer program is executed by the processor, the steps of the random access channel RACH resource configuration method according to claim 7 are implemented.

19. The network-side device according to claim 18, wherein
window length information of the time window is comprised in the RACH resource configuration information, or is obtained based on a correspondence between a RACH parameter and the window length information that is comprised in the RACH resource configuration information, or is agreed in advance; and
a value of N is comprised in the RACH resource configuration information, or is obtained based on a correspondence between the RACH parameter and the value of N that is comprised in the RACH resource configuration information, or is agreed in advance.

20. The network-side device according to claim 19, wherein the RACH parameter comprises at least one of the following:
- a priority of a service for which RACH is initiated;
- a reason for triggering connection re-establishment;
- a PRACH period; and
- a correlation between a physical random access channel occasion (RO) and a synchronous signal block, SSB.

* * * * *